(12) United States Patent
Negro et al.

(10) Patent No.: US 7,738,756 B2
(45) Date of Patent: Jun. 15, 2010

(54) ENERGY COUPLED SUPERLATTICE STRUCTURES FOR SILICON BASED LASERS AND MODULATORS

(75) Inventors: Luca Dal Negro, Cambridge, MA (US); Jae Hyung Yi, Cambridge, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 949 days.

(21) Appl. No.: 11/490,961

(22) Filed: Jul. 21, 2006

(65) Prior Publication Data

US 2007/0069332 A1   Mar. 29, 2007

Related U.S. Application Data

(60) Provisional application No. 60/701,385, filed on Jul. 21, 2005.

(51) Int. Cl.
   *G02B 6/10* (2006.01)
(52) U.S. Cl. .................................. 385/131; 385/142
(58) Field of Classification Search .................. None
   See application file for complete search history.

(56) References Cited

U.S. PATENT DOCUMENTS

| 5,319,727 | A | 6/1994 | Ford et al. | |
| 6,593,212 | B1 * | 7/2003 | Kub et al. | 438/458 |
| 7,135,699 | B1 * | 11/2006 | Atanackovic | 257/22 |

2002/0048289 A1   4/2002   Atanackovic et al.

OTHER PUBLICATIONS

Timoshenko et al., "Comparative study of photoluminescence of undoped and erbium-doped size-controlled nanocrystalline Si/SiO$_2$ multilayered structures" Journal of Applied Physics, vol. 96, No. 4, pp. 2254-2260.

Tsybeskov et al., "Nanocrystalline-silicon superlattice produced by controlled recrystallization" Appl. Phys. Letters, 72, Jan. 5, 1998, pp. 43-45.

Park et al., "Effect of Amorphous Si Quantum-Dot Size on 1.54nm Luminescence of ER" Journal of The Electrochemical Society, 152 (6) pp. 445-447.

Iacona et al., "Silicon nanocrystals and Er3+ ions in an optical microcavity" Journal of Applied Physics, vol. 89, No. 12, pp. 8354-8356.

Gourbilleau et al., "Fabrication and optical properties of Er-doped multilayers Si-rich SiO2/SiO2: size control, optimum Er-Si coupling and interaction distance monitoring" Optical Materials 27 (2005) pp. 868-875.

Saini et al., "A high index contrast silicon oxynitride materials platform for Er-doped microphotonic amplifiers" Mat. Res. Soc. Symp. Proc. vol. 817, 2004 Materials Research Society, XP-002345855, pp. L1.7.1-L1.7.7.

(Continued)

*Primary Examiner*—Omar Rojas
(74) *Attorney, Agent, or Firm*—Gauthier & Connors LLP

(57) ABSTRACT

A waveguide structure includes a SOI substrate. A core structure is formed on the SOI substrate comprising a plurality of multilayers having alternating or aperiodically distributed thin layers of either Si-rich oxide (SRO), Si-rich nitride (SRN) or Si-rich oxynitride (SRON). The multilayers are doped with a rare earth material so as to extend the emission range of the waveguide structure to the near infrared region. A low index cladding includes conductive oxides to act as electrodes.

16 Claims, 3 Drawing Sheets

OTHER PUBLICATIONS

Seo et al., "Controlling Er-Tm interaction in Er-Tm codoped silicon-rich silicon oxide using nanometer-scale spatial separation for efficient, broadband infrared luminescence" Applied Physics Letters, vol. 85 No. 18, Nov. 2004, pp. 4151-4153.

* cited by examiner

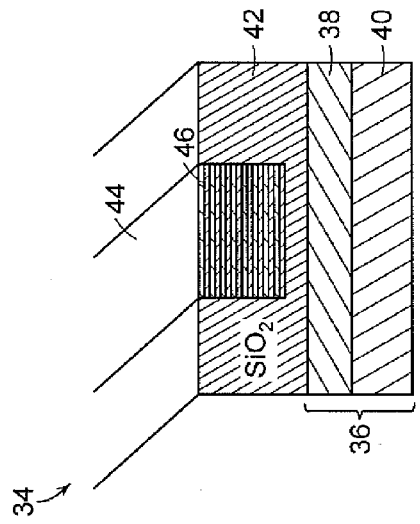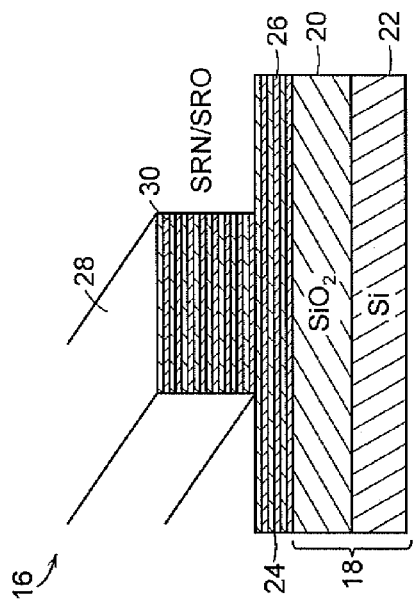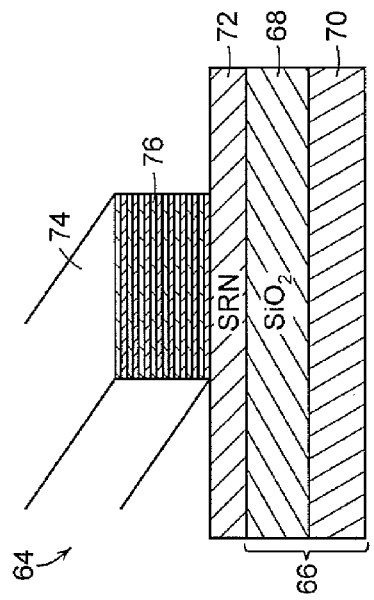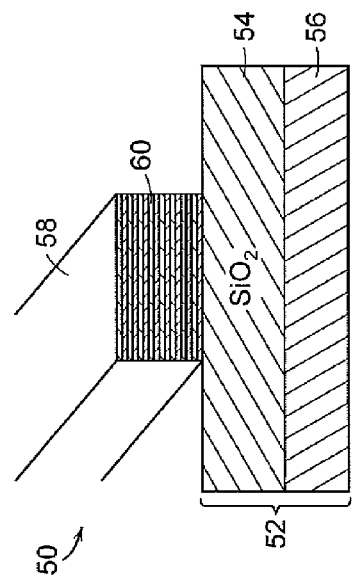

ENERGY COUPLED SUPERLATTICE STRUCTURES FOR SILICON BASED LASERS AND MODULATORS

PRIORITY INFORMATION

This application claims priority from provisional application Ser. No. 60/701,385 filed Jul. 21, 2005, which is incorporated herein by reference in its entirety.

BACKGROUND OF THE INVENTION

The invention relates to the field of waveguides, and in particular to combining different CMOS-compatible light-emitting Si-rich materials within light-emitting multilayers waveguide structures that can be used to fabricate an optically as well as an electrically driven silicon-based laser or modulator.

Generally, a superlattice denotes a structure (material) with periodically or aperiodically interchanging solid layers. Such structures possess additional periodicity on a scale larger than atomic. This leads to apparition of characteristic satellite peaks in X-ray diffraction patterns. Depending on the nature of components, magnetic, optical and semiconductor superlattices are distinguished. Carriers are influenced by the lattice disturbance. This can lead to significant increase of carrier mobility (used in microwave devices) or special optical features. There also exists a class of quasiperiodic superlattices named after Fibonacci. The Fibonacci superlattices are usually studied as a single-dimensional model of quasicrystal, where either electron hopping transfer interactions or on-site energies take two values arranged in a Fibonacci sequence. There is a need in the art to combine different CMOS-compatible light-emitting Si-rich materials within light-emitting multilayers waveguide structures that can be used to fabricate an optically as well as an electrically driven silicon-based laser or modulator

SUMMARY OF THE INVENTION

According to one aspect of the invention, there is provided a waveguide structure. The waveguide structure includes a SOI substrate. A core structure is formed on the SOI substrate comprising a plurality of multilayers having alternating or aperiodically distributed thin layers of either Si-rich oxide (SRO), Si-rich nitride (SRN) or Si-rich oxynitride (SRON). The multilayers are doped with a rare earth material so as to extend the emission range of the waveguide structure to the near infrared region. A low index cladding includes conductive oxides to act as electrodes.

According to another aspect of the invention, there is provide a method of forming a highly luminescence waveguide structure. The method includes providing a SOI substrate. Also, the method includes forming a core structure on the SOI substrate comprising a plurality of multilayers having alternating or aperiodically distributed thin layers of either Si-rich oxide (SRO), Si-rich nitride (SRN) or Si-rich oxynitride (SRON). The multilayers are doped with a rare earth material so as to extend the emission range of the waveguide structure to the near infrared region. Moreover, the method includes forming a low index cladding comprising conductive oxides to act as electrodes.

BRIEF DESCRIPTION OF THE DRAWINGS

FIGS. 2A-2D are schematic diagrams demonstrating the possible waveguide geometries formed in accordance with the invention.

DETAILED DESCRIPTION OF THE INVENTION

The invention provides a technique for combining different CMOS-compatible light-emitting Si-rich materials within light-emitting multilayers waveguide structures that can be used to fabricate an optically as well as an electrically driven silicon-based laser or modulator.

The invention uses commonly known CMOS materials (Si, SIN, SiON, SiGe, etc) driven to strong under-cooling or low annealing temperatures in order to provide a large density of small Si clusters to produce more favorable electrical injection matrices such as Si-rich nitride with longer light-matter interaction times and enhanced optical nonlinearities.

Materials and processing Si-rich oxide (SRO), Si-rich nitride (SRN) and Si-rich oxynitride (SRON) are the most promising candidates and offer the advantages of efficient photoluminescence, fast recombination time, materials reliability, and strong energy sensitization of rare earth atoms with Er in particular. Nitride and oxide materials can be doped with Er and other rare earth materials, such as Yb. Nd, Pr, Tm, and Ho, to extend the emission range in the near infrared region. Magnetron sputtering and PE-CVD deposition can be utilized to fabricate the materials. Single step and sequential annealing treatments can improve the optical emission properties and tune Si-cluster size and size-distribution. Different waveguides geometries can be defined by standard lithography and etching processes.

Figure 1:
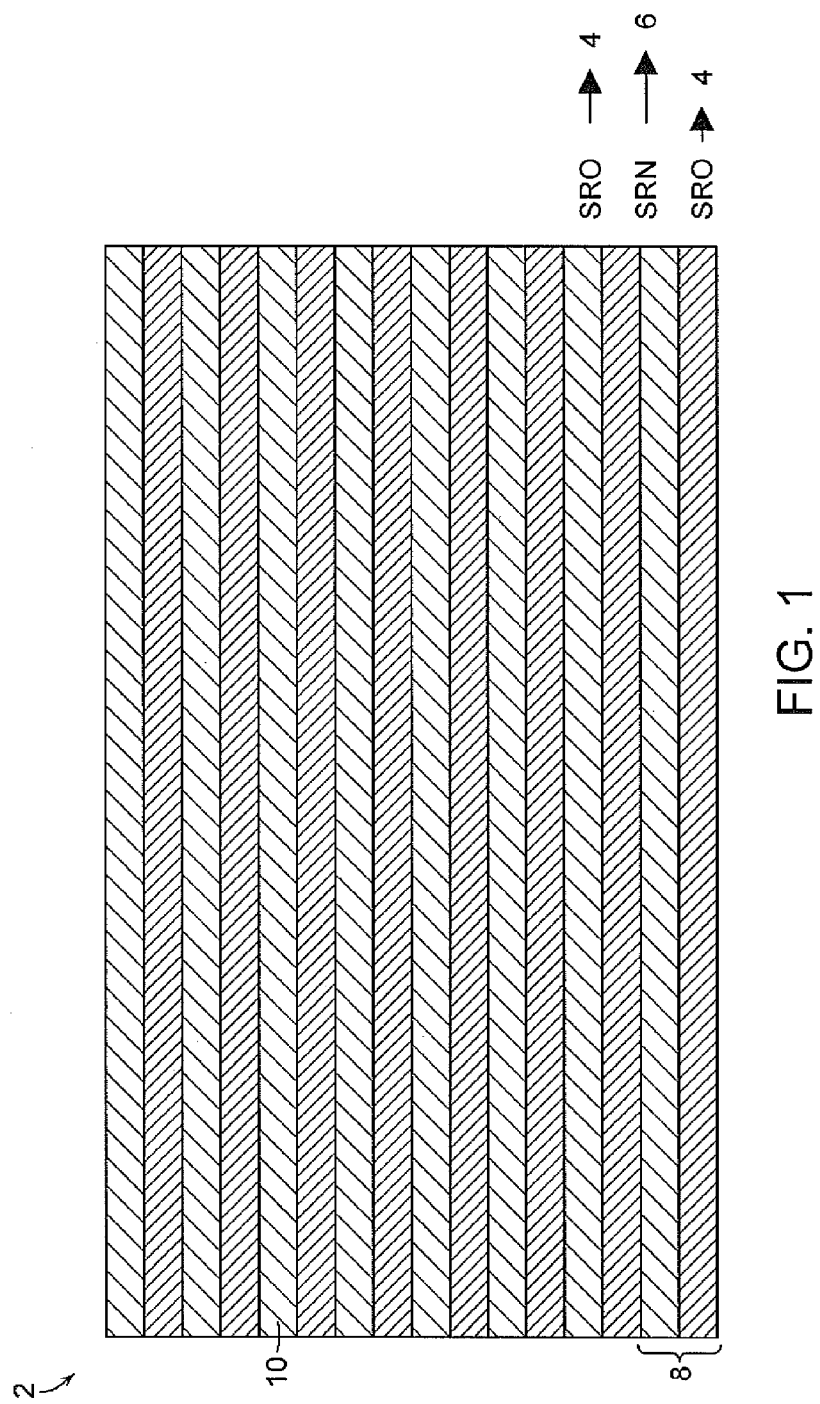
FIG. 1 is a schematic diagram demonstrating the formation of the core in accordance with the invention.

The invention requires uses deposition of light-emitting nanometer-thick SRO and SRN layers co-doped with rare earth ions in order to fabricate size-controlled and strongly coupled light-emitting waveguide cores suitable for electrical pumping, long waveguide interaction times and enhanced non-linear and electro-optic effects due to both the presence of multi-surfaces and the quantum-size non-linear enhancement. The use of SRN/SRO multilayers will provide higher refractive index in the waveguide core with respect to strain-compensated Si passive multilayer waveguide (MLW) structures FIG. 1 is a schematic diagram demonstrating the formation of a core 2 for a waveguide in accordance with the invention. The core 2 includes an active region 10 that comprises Si-rich oxide (SRO) 4 and Si-rich nitride (SRN) light-emitting multilayers 6. The SRO/SRN layer 8 sequence can be periodic (superlattice) or aperiodic. In the case of aperiodic arrangement the carrier transport properties and localization in the growth direction can significantly be altered. Moreover, the multilayers 6 can also be fractal sequences such as Fibonacci, Thue-Morse, Rudin-Shapiro, Cantor and generalizations.

In the active region 10 of the core 2, electrical current can be efficiently transported in SRN/SRO layers 4, 6, as opposed to the standard $SiO_2$/SRO multilayer case, where charge transfer is severely limited by the presence of insulating $Sio_2$ layers. Different electrode geometries can be utilized to achieve vertical and lateral carrier injection.

In the core 2, the SRO/SRN layers 4, 6 can be deposited periodically, as for standard superlattice structures, or can be arranged according to random, quasiperiodic, or aperiodic sequences with different localization and electron-hole transport properties, which dramatically affecting recombination and emission rates of the waveguide structure.

The core 2 can be fabricated by reactive sputtering or PE-CVD deposition by alternating ultra thin layers sized between 2 and 5 nm of SRO, SRON and SRN layers with strong absorption/emission spectrum overlapping. This strategy will allow investigating for the first time energy coupling effects between SRN, SRON and SRO materials leading to emission enhancement and simultaneous energy transfer to rare earth ions. Specifically, Er ions can be co-sputtered within SRN and SRO layers 4, 6 and energy transfer phenomena can occur from both SRO and SRN towards Er ions, leading to a strong enhancement of its excitation rate. The combination of Er and SRN is also extremely appealing for the demonstration of electrically driven luminescent devices, since it has been shown efficient charge injection in SRN films after low temperature annealing treatments.

The geometry of the SRN/SRO thin layers 4, 6 can be varied with strong effects on the superlattice projected band structures. Aperiodic superlattices with strong light-matter coupling can also be fabricated within the same thin-film deposition approach. In those structures, the aperiodicity in the arrangement of the SRN 4 and SRO layers 6 strongly modifies the carrier transport and localization properties on the nanometer scale along the growth direction, and partial Brillouin zone-folding and enhanced carrier localization can enhance the radiative recombination and opening new ways to control light-matter interaction in light emitting complex superlattices.

Light emitting multilayered core waveguides (MLCW) can be realized using high index SRO and SRN multilayers discussed herein. Er ions can also be co-sputtered in the waveguide core. Channel, ridge and rib-loaded geometries can be defined by standard lithography and etching as shown in FIGS. 2A-2B. Note the waveguide structures can further utilize low index cladding layers based on transparent conductive oxides such as ITO, IZO, InO, ZnO, which will provide vertical as well as lateral electric contacts.

FIG. 2A shows a rib MLCW structure 16 formed in accordance with the invention. The rib MLCW structure 16 is formed on a SOI substrate 18 having a $SiO_2$ layer 20 formed on a Si substrate 22. A cladding layer 24 is formed on the SOI substrate 18, and includes SRO/SRN multilayers 26. A core 28 is formed on the cladding layer 24. The action region of the core 28 includes SRO/SRN multilayers 30.

FIG. 2B shows an embedded strip MLCW structure 34. The embedded strip MLCW structure 34 is formed on a SOI substrate 36 having a $SiO_2$ layer 38 that is formed on a Si substrate 40. A cladding layer 42 comprising $SiO_2$ layer is formed on the SOI substrate 36. A core 44 is formed in a region where the cladding layer 42 surrounds the bottom and all side regions except the top region of the core 44. The active region of the core 44 comprises SRO/SRN multilayers 46.

FIG. 2C shows a strip MLCW structure 50. The strip MLCW 50 is formed on a SOI substrate 52 having a $SiO_2$ layer 54 formed on a Si substrate 56. A core 58 is formed on the SOI substrate 52. The active region of the core 58 includes SRO/SRN multilayers 60. FIG. 2D shows a strip-loaded MLCW 64. The strip-loaded MLCW 64 is formed on a SOI substrate 66 having a $SiO_2$ layer 68 that is formed on a Si substrate 70. A SRN layer 72 is formed on the SOI substrate 66. A core 74 is formed on the SRN layer 72. The active region of the core 74 includes SRO/SRN multilayers 76.

In addition to the waveguide structures shown in FIGS. 2A-2D, a one dimensional Fabry-Perot vertical microrocavities can also be fabricated in order to demonstrate stimulated emission under optical pumping. In particular, low loss and high transparency $Si_3N_4/SiO_2$ Bragg reflectors can be utilized to create the positive optical feedback on the Er:SRO or Er:SRN embedded active medium.

Figure 3B:
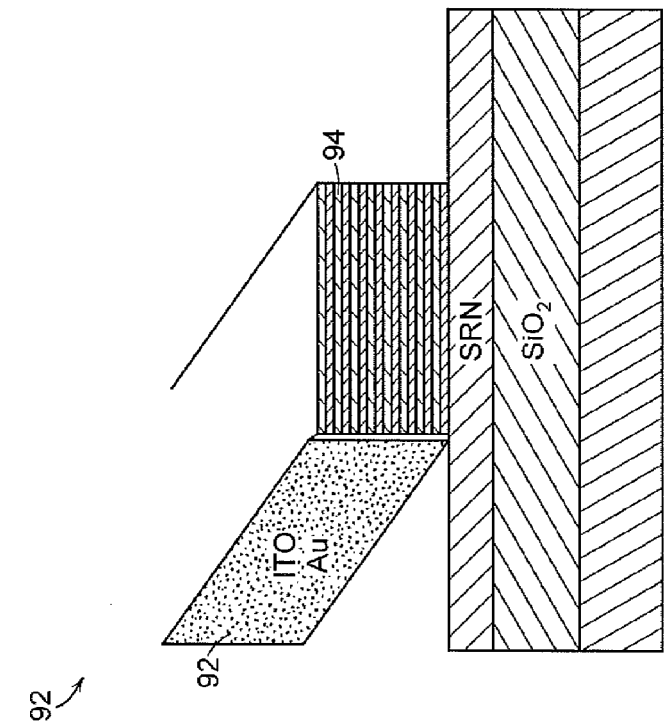
FIGS. 3A-3B are schematic diagrams demonstrating the possible arrangements used to form electrical contacts in accordance with the invention.
Figure 3A:
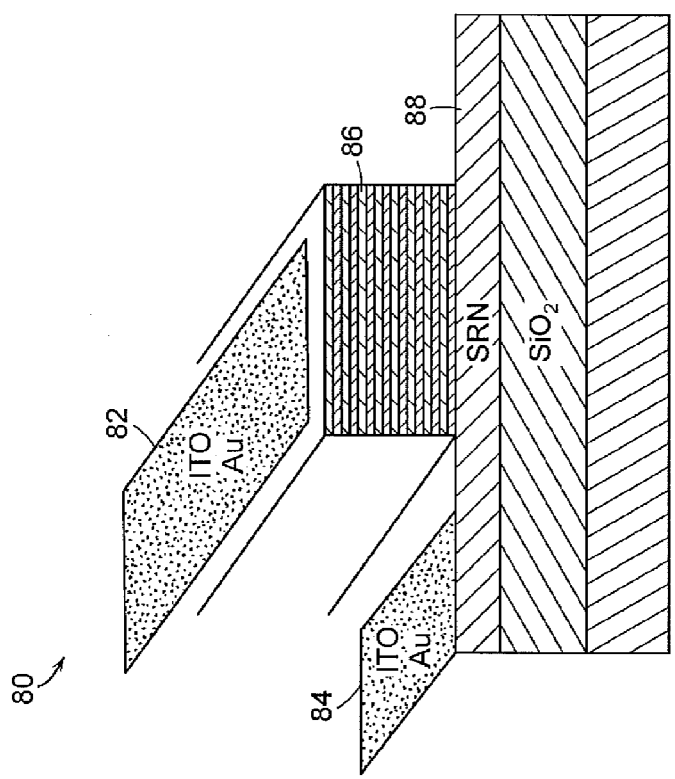

Lateral electrodes can be formed and an electric field can be applied across the core active regions shown in FIGS. 2A-2D. FIG. 3A shows a strip-loaded MLCW structure 80 having vertical two electrical contacts 82, 84. One of the vertical electrical contacts 82 is formed on the top region of the core 86 and another form on the SRN layer 88 of the strip-loaded MLCW structure 80. FIG. 3B shows a strip-loaded MLCW structure 92 having a lateral electrical contact 94 formed on a side region of the core 96. Note ITO or Au is evaporated and then strategically placed on the MLCW waveguides 80, 92 to form the electrical contacts.

The invention can also be suitable to from fast Si-based optical modulators based on electro-optic effects once lateral electrodes are introduced as in FIG. 3A. The centrosymmetric symmetry of the bulk materials is in fact strongly perturbed by the many interfaces that separate the nanometer-size layers and enhanced non-linear optical properties in Er:SRN multilayer systems can be investigated. Transparent conductive oxides such as ITO, IZO, InO, ZnO, standard metals such as Au, or a combination of both can be used to form the electrical contacts.

Although the present invention has been shown and described with respect to several preferred embodiments thereof, various changes, omissions and additions to the form and detail thereof, may be made therein, without departing from the spirit and scope of the invention.

What is claimed is:

1. A waveguide structure comprising:
   a SOI substrate;
   a semiconductor structure positioned on the SOI substrate, said semiconductor structure comprising either a multilayered arrangement or Si-rich nitride (SRN);
   a core structure that is formed on said semiconductor structure, said core comprising a plurality of multilayers having alternating or aperiodically distributed thin layers of either Si-rich oxide (SRO), Si-rich nitride (SRN), or Si-rich oxynitride (SRON), said multilayers are doped with a rare earth material so as to extend the emission range of said waveguide structure to the near infrared region; and
   a low index cladding comprising conductive oxides to act as electrodes.

2. The waveguide structure of claim 1, wherein said rare earth materials comprise Er, Yb. Nd, Pr, Tm, or Ho.

3. The waveguide structure of claim 1, wherein said core is patterned using lithography.

4. The waveguide structure of claim 3, wherein said core patterned to form a rib waveguide structure, a strip waveguide structure, a embedded strip waveguide structure, strip-loaded waveguide structure, or a channel waveguide structure.

5. The waveguide structure of claim 1, wherein said multilayers comprises Fibonacci, Thue-Morse, Rudin-Shapiro, Cantor generalizations of fractal sequences.

6. The waveguide structure of claim 5, wherein said multilayers comprise a thickness between 2 and 5 nm.

7. The waveguide structure of claim 1, wherein said core uses magnetron sputtering or PE-CVD deposition to fabricate the said multilayers.

8. The waveguide structure of claim 1, wherein said electrodes are formed either vertical or laterally on said waveguide structure.

9. A method of forming highly nonlinear waveguide structures comprising:

providing a SOI substrate; forming a semiconductor structure positioned on the SOI substrate, said semiconductor structure comprising either a multilayered arrangement or Si-rich nitride (SRN);

forming a core structure that is formed on said semiconductor structure, said core comprising a plurality of multilayers having alternating or aperiodically distributed thin layers of either Si-rich oxide (SRO), Si-rich nitride (SRN), or Si-rich oxynitride (SRON), said multilayers are doped with a rare earth material so as to extend the emission range of said waveguide structure to the near infrared region; and forming a low index cladding comprising conductive oxides to act as electrodes.

10. The method of claim 9, wherein said rare earth materials comprise Er, Yb. Nd, Pr, Tm, or Ho.

11. The method of claim 9, wherein said core is patterned using lithography.

12. The method of claim 11, wherein said core patterned to form a rib waveguide structure, a strip waveguide structure, a embedded strip waveguide structure, strip-loaded waveguide structure, or a channel waveguide structure.

13. The method of claim 9, wherein said multilayers comprises Fibonacci, Thue-Morse, Rudin-Shapiro, Cantor or generalizations of fractal sequences.

14. The method of claim 13, wherein said multilayers comprise a thickness between 2 and 5 nm.

15. The method of claim 9, wherein said core uses magnetron sputtering or PE-CVD deposition to fabricate the said multilayers.

16. The method of claim 9, wherein said electrodes are formed either vertical or laterally on said waveguide structure.

* * * * *